United States Patent [19]
Nakamura

[11] Patent Number: 5,577,872
[45] Date of Patent: Nov. 26, 1996

[54] TORQUE ENHANCING TIGHTENING SCREW

[75] Inventor: Daijiro Nakamura, Ono, Japan

[73] Assignee: Power Tool Holders Incorporated, Wilmington, Del.

[21] Appl. No.: 194,089

[22] Filed: Feb. 9, 1994

Related U.S. Application Data

[62] Division of Ser. No. 31,311, Mar. 15, 1993.

[51] Int. Cl.⁶ .............................. F16B 23/00; F16B 37/08
[52] U.S. Cl. ..................... 411/432; 411/402; 411/433; 411/917
[58] Field of Search .................................. 411/432, 433, 411/437, 402, 917, 919, 408

[56] References Cited

U.S. PATENT DOCUMENTS

| | | |
|---|---|---|
| 3,614,900 | 10/1971 | Wahlmark . |
| 3,756,092 | 9/1973 | Gartner . |
| 4,434,586 | 3/1984 | Muller et al. . |
| 4,502,824 | 3/1985 | Dohse et al. . |
| 4,841,796 | 6/1989 | Teramachi . |
| 4,864,884 | 9/1989 | Klinkenberg . |
| 4,941,790 | 7/1990 | Kim . |
| 4,955,744 | 9/1990 | Barth et al. . |
| 4,976,071 | 12/1990 | Stabler . |
| 4,980,994 | 1/1991 | Helm et al. . |
| 5,022,188 | 6/1991 | Borst . |
| 5,042,207 | 8/1991 | Kim . |
| 5,161,334 | 11/1992 | Schaal et al. . |
| 5,388,942 | 2/1995 | Bonacina et al. . |

FOREIGN PATENT DOCUMENTS

| | | |
|---|---|---|
| 0034640A1 | 9/1981 | European Pat. Off. . |
| 0231500B1 | 12/1986 | European Pat. Off. . |
| 0497138A1 | 8/1992 | European Pat. Off. . |
| 0600854A1 | 6/1994 | European Pat. Off. . |
| 3012836C2 | 9/1985 | Germany . |
| 3523746A1 | 1/1987 | Germany . |
| 3702142A1 | 8/1988 | Germany . |
| 3824040C1 | 11/1989 | Germany . |
| 3903765A1 | 8/1990 | Germany . |
| 3903766A1 | 8/1990 | Germany . |
| 3613987C2 | 9/1990 | Germany . |
| 4031725A1 | 4/1992 | Germany . |
| 4102420A1 | 7/1992 | Germany . |
| 4209146A1 | 9/1992 | Germany . |
| 4238466C1 | 11/1992 | Germany . |
| 4243328C1 | 6/1994 | Germany . |
| 4305317A1 | 9/1994 | Germany . |
| WO9204549 | 3/1992 | WIPO . |

OTHER PUBLICATIONS

U.S. application Ser. No. 08/216,220, Filed Mar. 22, 1994 (No Copy).
U.S. application Ser. No. 08/031,311, Filed Mar. 15, 1993 (No Copy).
Abstract of EP 558277 A1–Dated Feb. 28, 1992.
Abstract of EP 345271 A–Dated Feb. 21, 1987.
Abstract of EP330672–Dated Jan. 15, 1987.
Abstract of DE 3903–765–A–Dated Feb. 9, 1989.
Abstract of DE 3903–766–A–Dated Feb. 9, 1989.
Abstract of DE 4102420–A–Dated Jan. 28, 1991.
Abstract of DE 3824–040–C–Dated Jul. 15, 1988.
Abstract of DE 3613–987–A–Dated Apr. 25, 1986.
Abstract of DE 3523–746–A Dated Jul. 3, 1985.
Abstract of DE 3012–836–A–Dated Apr. 2, 1980.

*Primary Examiner*—Neill R. Wilson
*Attorney, Agent, or Firm*—Dority & Manning

[57] ABSTRACT

The tightening screw of the invention comprises a screw member forming a female threads or male threads in the shaft core part, a flange ring fitted to the outer periphery of the screw member to contact with the object to be tightened, an operating ring for feeding a rotational force by fitting oppositely to the flange ring on the outer periphery of the screw member, and a torque transmitting member interspaced between the screw member and operating ring for transmitting the rotational force of the operating ring to the screw member. The torque transmitting member comprises a reduction mechanism for transmitting the rotational force of the operating ring to the screw member by reducing the speed, and a unidirectional torque limiter for cutting off transmission of torque in the tightening direction of the screw member to the object to be tightened at a specific load.

5 Claims, 9 Drawing Sheets

5,577,872

TORQUE ENHANCING TIGHTENING SCREW

BACKGROUND OF THE INVENTION

The present application is a divisional application of U.S. Ser. No. 08/031,311, filed Mar. 15, 1993.

The present invention relates to a tightening screw (for example, a nut) for tightening a rotary tool such as the wheel of a hand grinder and the circular saw of a hand saw to a mounting threaded part (for example, male threading) spirally provided in a drive shaft. The nut is capable of being tightened powerfully and loosened with a small rotary input, and is also capable of regulating excessive tightening.

To mount a rotary tool such as a grinding wheel and circular saw on a driving shaft, hitherto, a flange and male threads were formed at the end portion of the driving shaft, and the rotary tool was fitted to the male threaded part, and a tightening screw with female threads (such as a nut) was fitted on its outer part, and by tightening the nut, the rotary tool was fixed between the nut and the flange.

In tightening and loosening operations of such a nut, however, a power tool such as a wrench was generally used, and therefore a sufficient amplification may not be obtained because only this power tool is used for amplifying the force to tighten or loosen the nut.

Besides, in the use of such a rotary tool, if the rotary tool is used with an impact, the nut may be tightened more than desired by the impact and its reaction. Thus, the nut may be too tight when replacing the rotary tool, and it may not be removed by a power tool such as a wrench, and the nut cannot be removed unless the rotary tool is broken in an extreme case.

OBJECTS AND SUMMARY OF THE INVENTION

The invention relates to a tightening screw comprising a screw member forming female threads or male threads in the shaft core part, a flange ring fitted to the outer periphery of the screw member to contact with the object to be tightened, an operating ring for transmitting a rotational force by fitting oppositely to the flange ring on the outer periphery of the screw member, and a torque transmitting member interspaced between the screw member and operating ring for transmitting the rotational force of the operating ring to the screw member, wherein the torque transmitting member comprises a reduction mechanism for transmitting the rotational force of the operating ring to the screw member by reducing the speed of the operating ring, and an unidirectional torque limiter for cutting off transmission of torque in the tightening direction of the screw member to the object to be tightened at a specific load.

It is a first object of the invention to present a tightening screw capable of obtaining a large tightening force or loosening force with a small rotary input, mounting the object securely, tightening or loosening directly by hand without using a power tool, because of the generation of a powerful rotational force increased in torque, and enhancing the attaching and detaching manipulation of the tightening screw.

It is a second object of the invention to present a tightening screw capable of being attached and detached quickly without taking time in attaching and detaching because the rotary motion of the rotating ring or operating ring is directly the rotary motion of the screw member until the flange ring of the tightening screw abuts against the object to be tightened to fix the rotary motion.

It is a third object of the invention to present a tightening screw capable of preventing excessive tightening of the tightening screw by interspacing a flange ring for keeping a relative rotary motion between the rotating ring and the object to be tightened, so that the rotating ring may not rotate together with the object to be tightened.

It is a fourth object of the invention to present a tightening screw capable of distributing uniformly the uneven loads of the screw members, rotating the tightening screw smoothly, and tightening with an effective increased torque, by disposing plural screw members uniformly on the circumference around the bolt to be tightened.

It is a fifth object of the invention to present a tightening screw capable of being formed in a small, compact size without increasing the thickness of the tightening screw by obtaining a sufficient range for the female threads of the screw member for the bolt to be tightened by overlaying the rotating ring and screw member inside and outside.

It is a sixth object of the invention to present a tightening screw capable of increasing torque significantly in the tightening or loosening direction by obtaining a large reduction ratio by the difference in the number of teeth between the inner and outer gears or difference in the wave number between the inner and outer cycloid curves.

It is a seventh object of the invention to present a tightening screw which is prevented from being tightened more than necessary by impact or its reaction so as to be unable to be released. If the object to be tightened such as a rotary tool is used with an impact, the object is obtained by setting the unidirectional torque limiter at, for example, a force capable of operating directly by hand, so that excessive tightening may be regulated, and that manual releasing of the screw member may be easy when releasing the tightening screw.

Additional objects and advantages of the invention will be set forth in part in the following description, or may be obvious from the description, or may be learned through practice of the invention.

DETAILED DESCRIPTION OF THE PREFERRED EMBODIMENTS

Figure 1:
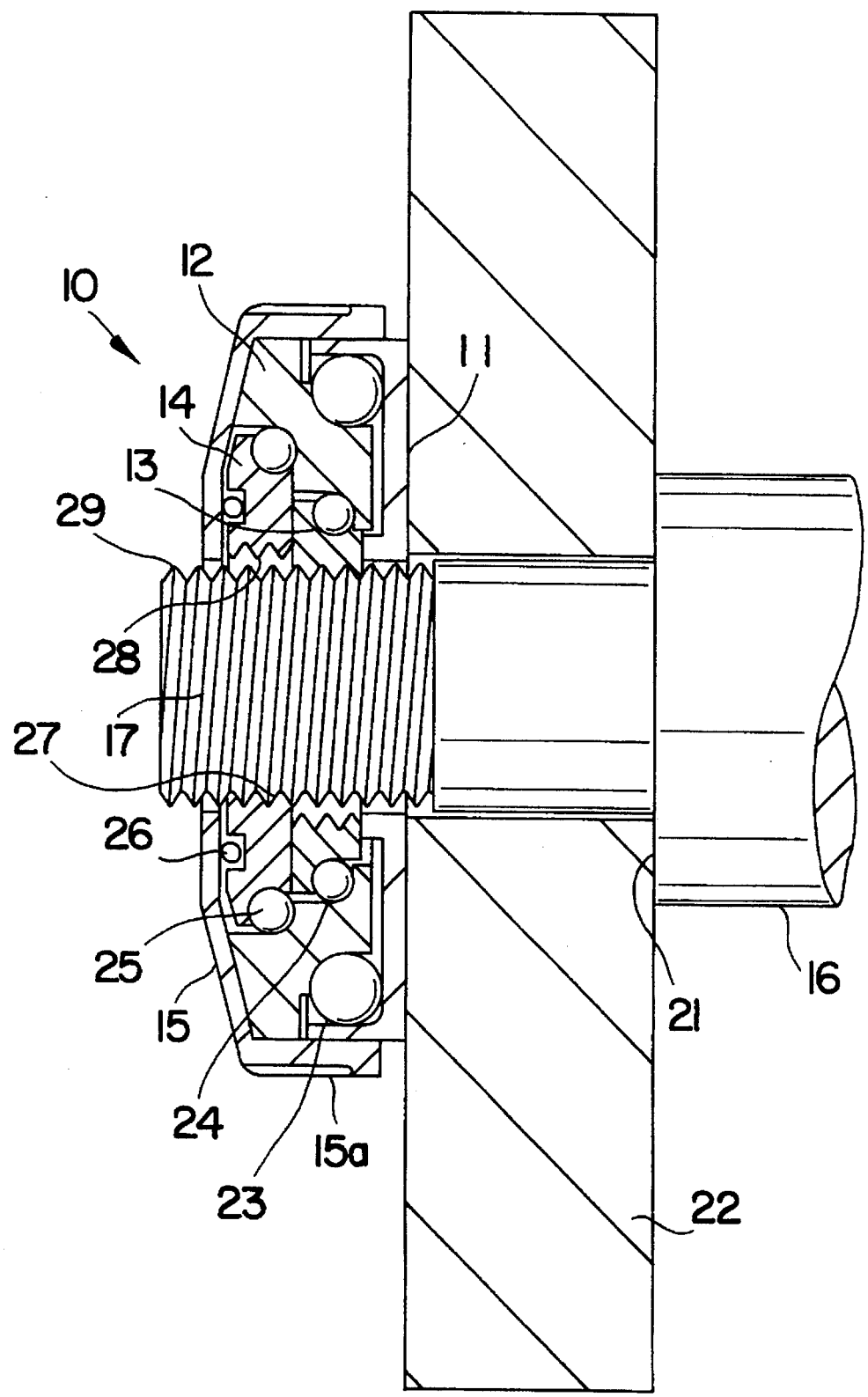
FIG. 1 is a sectional view of a tightening screw.

Reference will now be made in detail to the presently preferred embodiments of the invention, one or more examples of which are illustrated in the drawings. Each example is provided by way of explanation of the invention, and not as a limitation of the invention. In fact, it will be apparent to those skilled in the art that various modifications and variations can be made in the invention without departing from the scope and spirit of the invention. The numbering of components is consistent throughout, with the same components having the same number.

Figure 2:
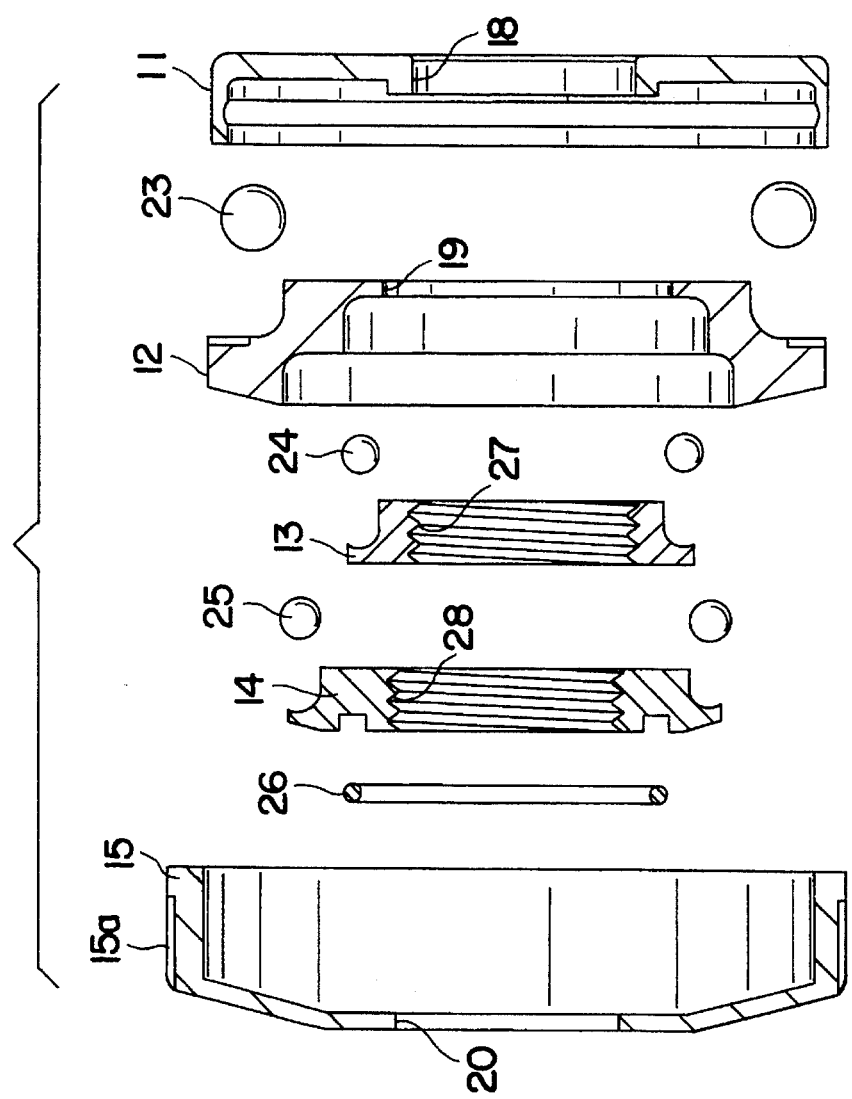
FIG. 2 is an exploded sectional view of a tightening screw.

The drawings show a tightening screw, and in FIG. 1 and FIG. 2 the tightening screw 10 is composed of a flange ring 11, a rotating ring 12, screw members of a first nut ring 13 and a second nut ring 14, and an operating ring 15, and in each central part of the flange ring 11, rotating ring 12 and operating ring 15, for example, insertion holes 18, 19, 20 are formed for inserting mounting bolt 17 of a drive shaft 16 of a power tool such as hand grinder. A flange 21 is formed on the drive shaft 16, and a rotary tool 11 to be tightened, for example a wheel of a hand grinder, is tightened and fixed between the flange 21 and the tightening screw 10 on the mounting bolt 17.

The rotating ring 12 is rotatably held in the flange ring 11 through a bearing 23, and the nut rings 13, 14 are rotatably held in the rotating ring 12 through bearings 24, 25, respectively. The rotating ring 12 is press-fitted into the operating ring 15, and the rotating ring 12 and operating ring 15 are fixed in one body. On the outer periphery of the operating ring 15, a knurling 15a for rotating is formed. Numeral 26 is an O-ring for sealing the gap.

Figure 3:
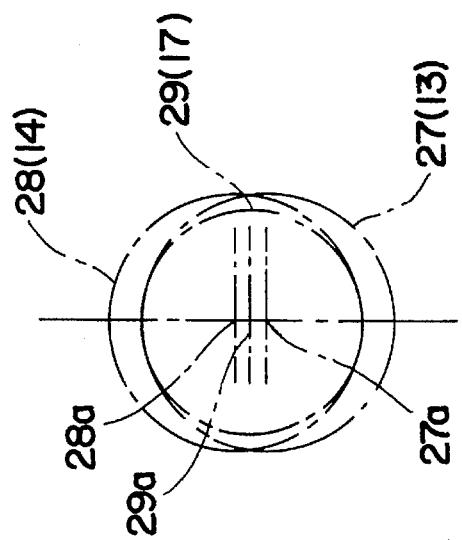
FIG. 3 is an explanatory diagram showing an eccentric state of a nut ring.

Female threads 27, 28 cut in the nut rings 13, 14 are formed in the same pitch as the male threads 29 of the mounting bolt 17, and the screw diameter of the female threads 27, 28 is greater than that of the male threads 29. The nut rings 13, 14 are held in the rotating ring 12 by eccentricity so that each part of the female threads 27, 28 may be engaged with the male threads 29 of the mounting bolts 17. The relative eccentric positions of the first nut ring 13 and second nut ring 14 are spaced at an interval of 180 degrees so as to be equally distributed on the circumference of the center 29a of the mounting bolt 17 (male threads 29) as shown in FIG. 3. Meanwhile, FIG. 3 shows the effective diameters of the female threads 27, 28 and male threads 29, and 27a is the center of the female threads 27, 28a is the center of the female threads 28, and these centers 27a, 28a are remote from the center 29a of the male threads 29 by 180 degrees.

By using thus composed tightening screw 10, in order to mount the rotary tool 22 on the mounting bolt 17 of the drive shaft 16, the operating ring 15 of the tightening screw 10 is directly rotated by manual operation on the male threads 29 of the mounting bolt 17, and the female threads 27, 28 of the both nut rings 13, 14 are screwed onto male threads 29. In this screwing operation, if the flange ring 11 does not contact with the rotary tool 22, the operating ring 15, flange ring 11, rotating ring 12, and both nuts 13, 14 are rotated together by the assembling load or internal friction of the components forming screw 10. In other words, the components are rotatably fixed relative to each other due to internal friction and screw 10 is rotated as a unitary object until flange ring 11 contacts rotary tool 22. The tightening screw 10 is fed forward through rotation by the engagement between the contact parts of the female threads 27, 28 of the both nut rings 13, 14 and the male threads 29 of the mounting bolt 17.

Subsequently, when the flange ring 11 abuts against the rotary tool 22, its rotation is loaded through contact with rotary tool 22 and rotation of the flange ring 11 is stopped by this load. Further rotary input applied to the rotating ring 12 through rotation of the operating ring 15 is thus applied to both nut rings 13, 14 forcing the nut rings to roll around threaded shaft 17. The nut rings 13, 14 make rolling motions so that the female threads 27, 28 engage and roll on the periphery of the male threads 29 of the mounting bolt 17. Due to the eccentricity between nuts 13, 14, and bolt 17, the nut rings 13, 14 travel in an eccentric path relative to rotating ring 12 providing a rolling contact between female threads 27, 28 and male threads 29. As the nuts 13, 14 are eccentric in that the female threads 27, 28 are longer than the male threads 29 in peripheral length, this revolution means slowdown of the screw pitch feed of the rotating ring 12 resulting in a torque increase in the nut rings 13, 14. By the revolution of the increased torque, the nut rings 13, 14 are screwed to the mounting bolt 17 so that the rotary tool 22 may be tightened and fixed to the mounting bolt 17 with the tightening force of the increased torque.

Incidentally, when the two nut rings 13, 14 are uniformly disposed as shown in FIG. 3, the bias load with increased torque of the nut rings 13, 14 uniformly acts on the periphery of the mounting bolt 17 since the rolling contact of female threads 27, 28 with male threads 29 is offset by 180 degrees, so that smooth tightening may be achieved.

The torque increase rate of the nut rings 13, 14 is greater as the screw diameter having the greater diameter of the female threads 27, 28 approaches the screw diameter of the male threads 29 having the smaller diameter of the mounting bolt 17, and becomes smaller as going apart. In other words, the torque increase rate is greater as the peripheral length of the female threads 27, 28 is closer to the peripheral length of the male threads 29.

When loosening the tightening screw through rotation of the operating ring 15 in the loosening direction, since the rotation of flange ring 11 is blocked as the flange ring 11 hits against the object such as the rotary tool 22, the nut rings 13, 14 are in their rotating state, as discussed above, in the loosening direction. As the rotary operation of the rotating ring 12 in the loosening direction revolves the nut rings 13, 14, the nut rings 13, 14 are rotated in the loosening direction with the same increased torque force as discussed above with respect to operation of the device in the tightening direction.

Consequently, as the nut rings 13, 14 are loosened, and the flange ring 11 looses contact with the object such as the rotary tool, the entire tightening screw 10 will rotate in one body due to internal loading or friction between the components, and the rotation of the rotating ring 12 becomes the rotation of the nut rings 13, 14, so that loosening may be quickened.

In the embodiment described herein, the two nut rings 13, 14 are used, but it is possible to use only one nut ring, or three or more. When utilizing a plurality of nut rings, it is desired to distribute the engaging positions with the bolts to be tightened uniformly so as to apply uniform loads to the bolts to be tightened. In the described embodiment, meanwhile, the tightening screw 10 is rotated by hand, but a wrench or other power tool may be also used. In this case, it is possible to tighten with less effort.

A second embodiment of the invention is described below by reference to FIGS. 4 through 6.

Figure 4:
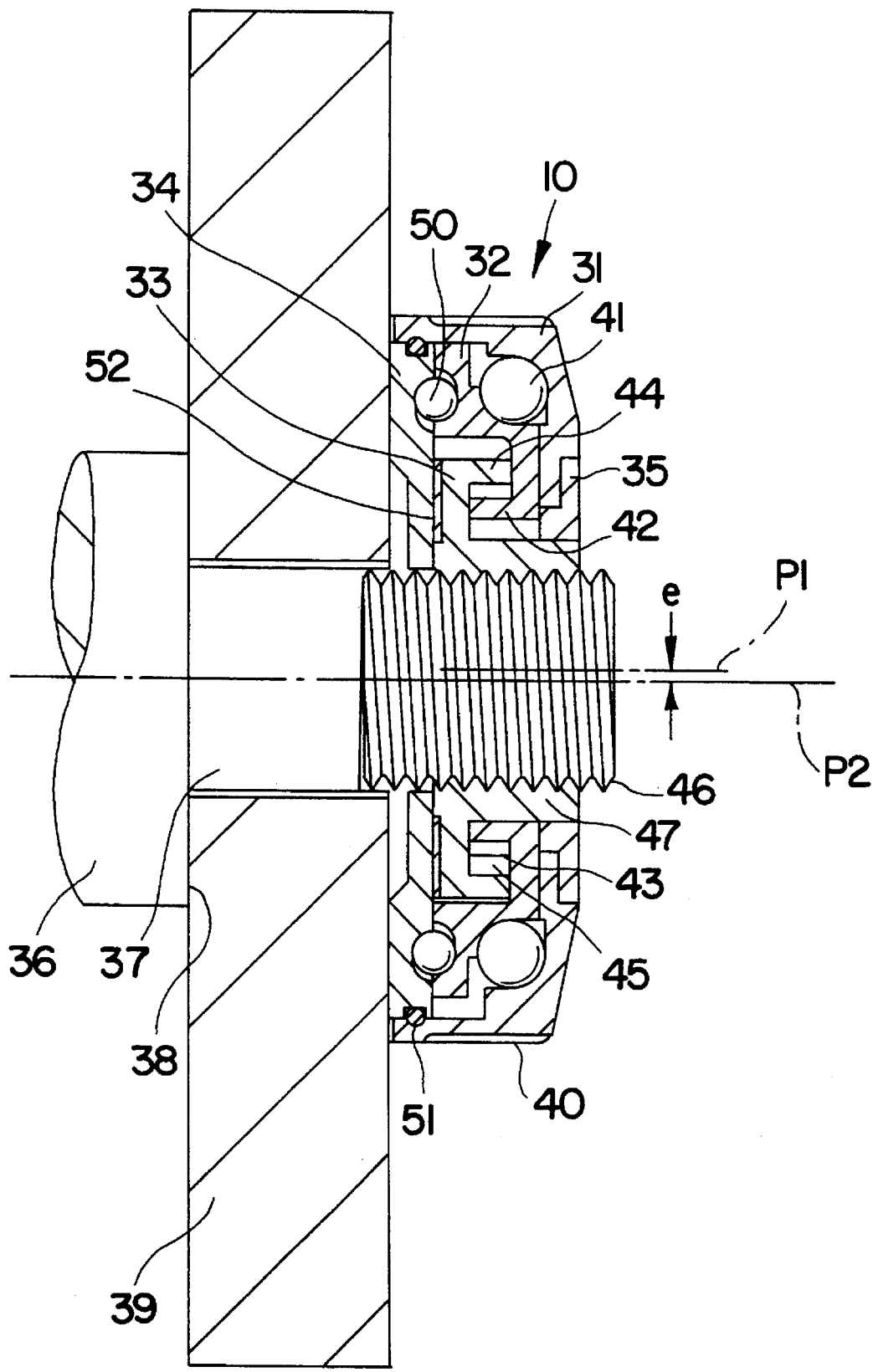
FIG. 4 is a sectional view of another embodiment of a tightening screw.
Figure 5:
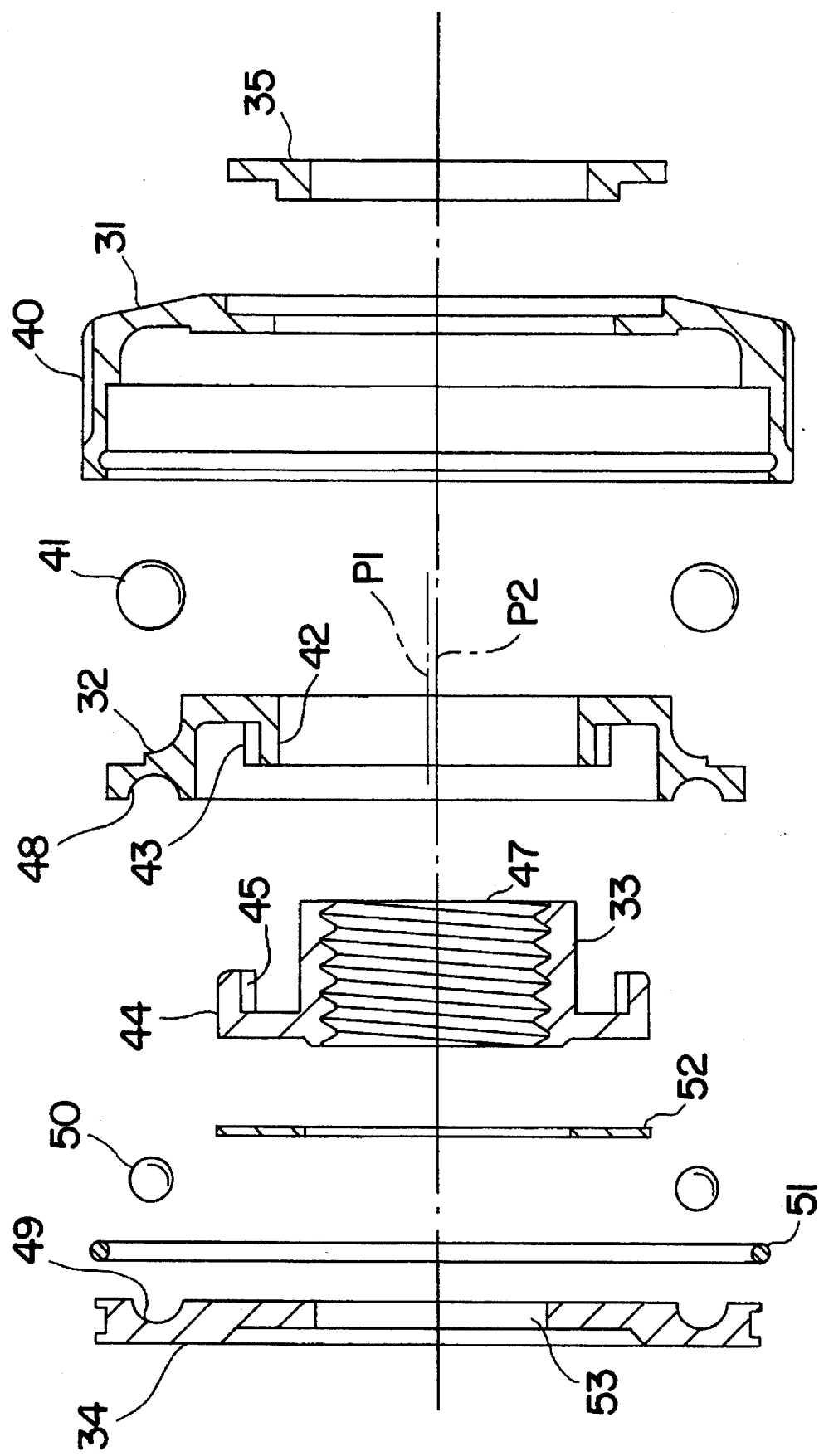
FIG. 5 is an exploded sectional view of the tightening screw shown in FIG. 4.
Figure 6:
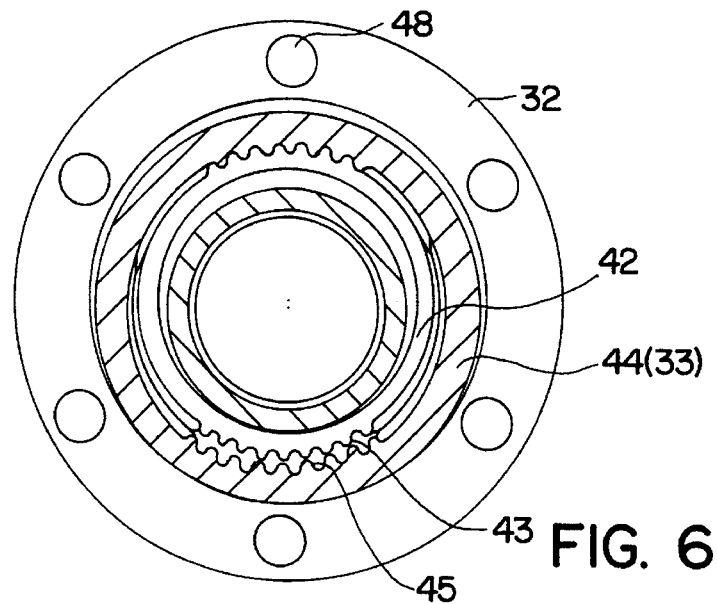
FIG. 6 is a plan view of a rotating ring shown in FIG. 4.

The drawings show a tightening screw 10, and in FIG. 4 and FIG. 5, the tightening screw 10 is composed of an operating ring 31, a rotating ring 32, a screw member 33, a flange ring 34, and a holding ring 35. The tightening screw 10 is screwed to a mounting bolt 37 of a drive shaft 36, and tightens and fixes a rotary tool 39, for example, a wheel of a hand grinder, against a flange 8 formed on the drive shaft 36.

The operating ring 31 serves also as the housing, and opens in the central part in a pi-section, and a knurling 40 is cut in the outer periphery to receive and enhance manual rotary input. A bearing 41 is provided in the inner periphery of operating ring 31 to rotatably hold the rotating ring 32. The center of rotation P1 of the rotating ring 32 is eccentrically held at an eccentricity e to the center of rotation P2 of the operating ring 31, as seen particularly in FIG. 4.

A tube 42 is formed in the shaft core part of the rotating ring 32, and an outer gear 43 is formed on the outer periphery of the tube 42, and the number of teeth of this outer gear 43 is defined at 38.

The screw member 33 has a tube 44 formed on its outer periphery, and the inner periphery of the tube 44 has an inner gear 45 having 40 teeth with a difference of 2 teeth from the number of teeth of the outer gear 43 of the rotating ring 32. Inner gear 45 is partially engaged with the outer gear 43, and the rotating ring 32 and screw member 33 are overlaid inside and outside, as illustrated particularly in FIG. 4. In the shaft core part of the screw member 33, female threads 47 to be engaged with male threads 46 of the mounting bolt 37 are cut.

The central part of the flange ring 34 includes insertion hole 53 for insertion of mounting bolt 37. In the mutually confronting sides of the flange ring 34 and the rotating ring 32 (see FIG. 6), engaging recess parts 48, 49 and a ball 50 are used to regulate the revolution and permit the rotation of the rotating ring 32. The flange ring 34 is holding its outer periphery rotatably relatively on the operating ring 31 through an O-ring 51.

In the confronting surfaces of the flange ring 34 and screw member 33, a thrust washer 52 is inserted. The side surface of the flange ring 34 is slightly projecting outward from the end surface of the operating ring 31.

The holding ring 35 is press-fitted into the end outer periphery of the screw member 33, and bears the operating ring 31, and also prevents the operating ring 31 and rotating ring 32 from slipping out.

To mount the rotary tool 39 on the mounting bolt 37 of the drive shaft 36 by the thus composed tightening screw 10, the flange ring 34 side of the tightening screw 10 is set opposite to the rotary tool 39 side. The female threads 47 of the screw member 33 of the tightening screw 10 are engaged with the male threads 46 of the mounting bolt 37, and the knurled 40 part of the operating ring 31 is directly rotated by hand, thereby engaging the male threads 46 and female threads 47.

At the time of screwing, if the flange ring 34 is not contacting with the rotary tool 39, the operating ring 31, rotating ring 32, screw member 33, and flange ring 34 are rotated together by the assembling load or internal friction which exists between the components. Thus, the rotation of the operating ring 31 directly becomes the rotation of the screw member 33, so that the tightening screw 10 is fed in thread pitches.

When the flange ring 34 abuts against the rotary tool 39 and its rotation is loaded to stop the rotation of the flange ring 34 with the load relative to rotary tool 39, the rotation ring 32 is also stopped of its revolution by the engagement between the engaging recesses 48, 49 with the flange ring 34 and the ball 50, and only rotation of rotating ring 32 relative to flange ring 34 is permitted. Further rotation of the operating ring 31 causes the rotating ring 32 to rotate in the same direction. Due to the eccentricity between operating ring 31 and rotating ring 32, rotation of operating ring 31 tends to "push" rotating ring 32 through driving contact with balls 41 in the same rotational direction. Rotating ring 32 may be thought of as assuming a "wobbling" rotating motion. This rotation causes to rotate the screw member 33 by engagement of the teeth between outer gear 43 and inner gear 45. Due to the difference in the number of teeth between the outer gear 43 of the rotating ring 32 and the inner gear 45 of the screw member 33 (this rotating direction is the same as the rotating direction of the operating ring 31), this rotation results in a reduction in the speed of rotation of the operating ring 31 which is transferred through rotating ring 32 to screw member 33. This speed reduction results in a torque increase, and the screw member 33 is engaged with the bolt 37 to be tightened with the increased torque and reduced speed. Thus, the rotary tool 39, as the object of tightening, is tightened and fixed to the flange 38 of the bolt 37 to be mounted with a large tightening force of increased torque.

Incidentally, the reduced speed rotation of the screw member to the operating ring 31 is (number of teeth of inner gear 45–number of teeth of outer gear 43)/number of teeth of outer gear 43, and in this embodiment, a speed of reduction of (40 teeth–38 teeth)/38 teeth=2/38=1/19 is obtained.

When loosening the tightening screw 10, since the flange ring 34 is already hitting against the rotary tool 39 and its rotation is arrested, the rotating ring 32 is in a rotatable state, and therefore as the rotating motion of the operating ring 31 in the loosening direction rotates the rotating ring 32, the screw member 33 is loosened with increased torque under the same principles as discussed above.

As the screw member 33 is loosened, and the flange ring 34 looses contact with the rotary tool 39, and its rotation is permitted, the entire tightening screw 10 is rotated in one body, and the rotation of the operating ring 31 directly becomes the rotation of the screw member 33, thereby making it possible to loosen screw 10 quickly.

In this embodiment, the tightening screw 10 is rotated manually, but a wrench or other power tool may be used. In this case, it is possible to operate screw 10 to tighten and loosen with a less effort. The tightening screw of the invention is realized by forming female threads 47 in the screw member 33, so that it may be used as a general nut.

Although the screw member 33 in the embodiment 2 is used as a nut by forming female threads 17, it may be also used as a bolt by forming male threads in the screw member 33.

A third embodiment of the invention is described in detail below by reference to FIGS. 7 through 11.

Figure 8:
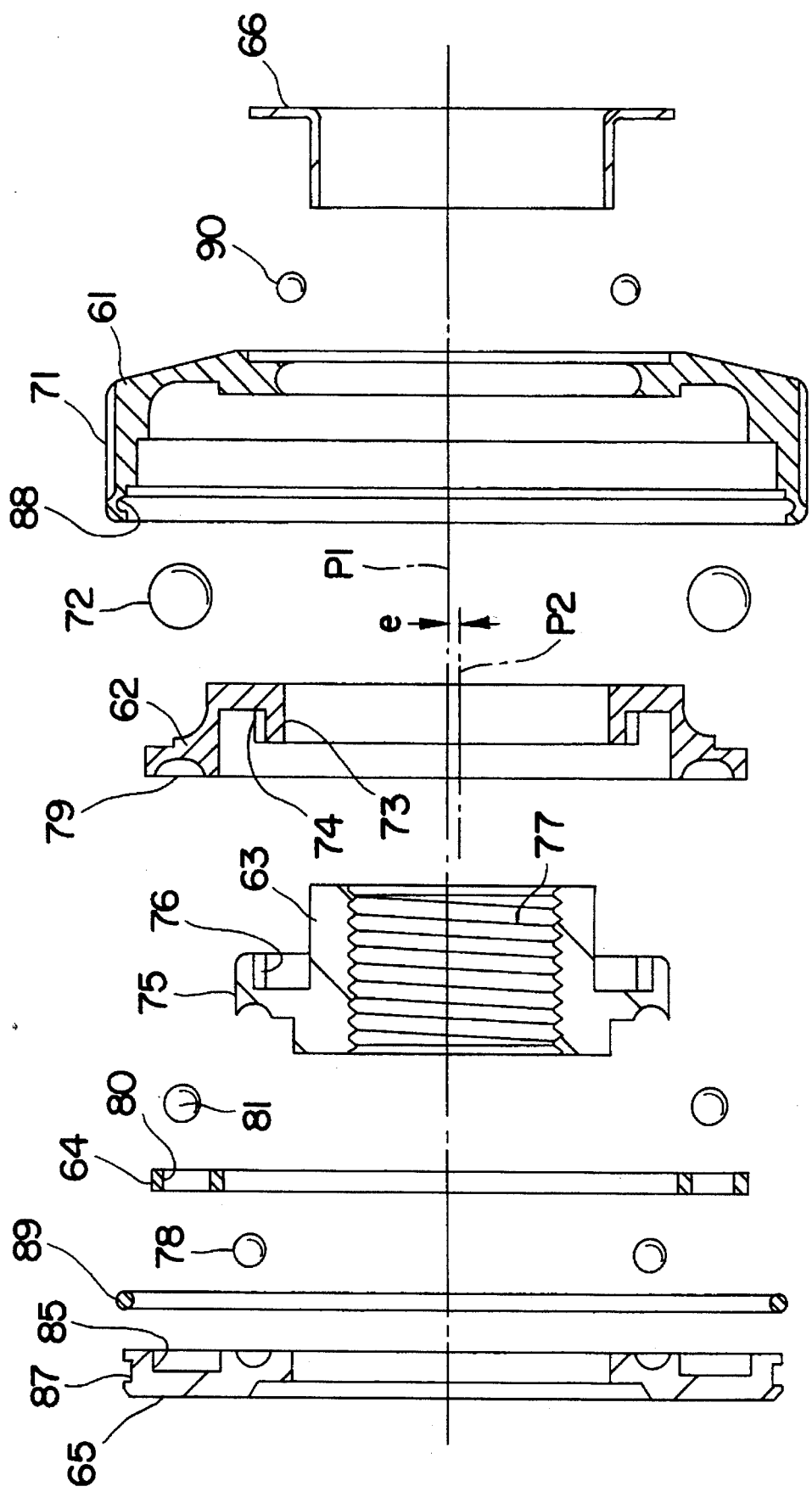
FIG. 8 is an exploded longitudinal sectional view of the tightening screw shown in FIG. 7.

The embodiment relates to a tightening screw having a function of preventing excessive tightening through a torque limiter installed at the tightening side, and in FIG. 1 and FIG. 8, the tightening screw 10 is composed of an operating ring 61, a rotating ring 62, a ring-shaped screw member 63, a ring-shaped sliding member 64, a flange ring 65, and a holding ring 66. This tightening screw 10 is screwed to a mounting bolt 68 of a drive shaft 67, and tightens and fixes a rotary tool 70, for example, the wheel of a hand grinder, together with an inner flange 69 mounted on the drive shaft 67.

The operating ring 61 is a ring in a pi-section, opening in the central part, and a knurling 71 is cut in the outer periphery to receive and enhance a manual rotary input. The rotating ring 62 is rotatably held through a bearing 72 in the inner periphery, and the center of rotation P1 of the rotating ring 62 is held eccentric at an eccentricity e to the center of rotation P2 of the operating ring 61, as seen in FIG. 8.

Figure 9:
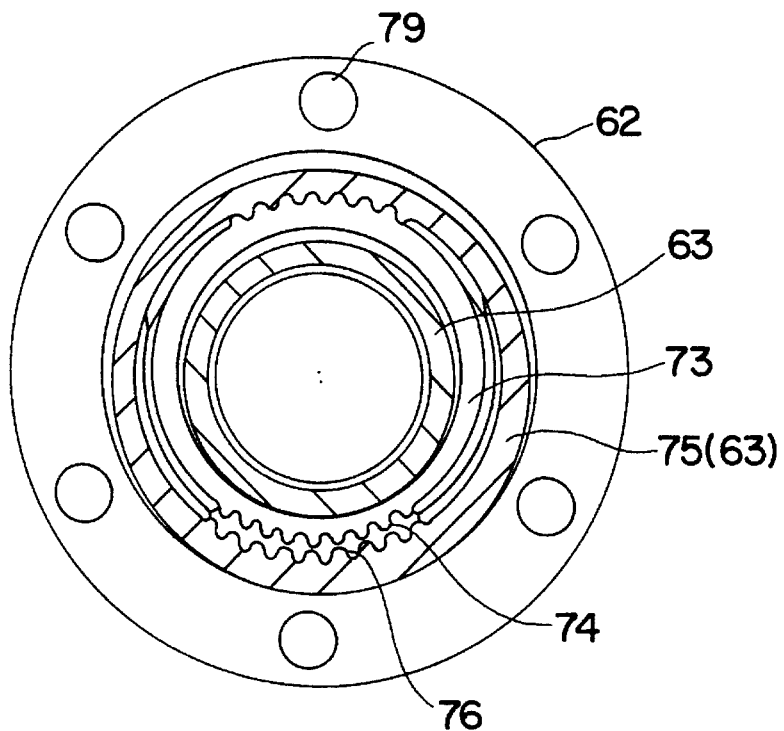
FIG. 9 is a sectional view showing the left side of the rotating ring and the engaging parts of the inner gear and outer gear of the embodiment shown in FIG. 7.

As shown in FIG. 9, a tube 73 is formed on the shaft core part of the rotating ring 62, and an outer gear 74 is formed on the outer periphery of the tube 73. The number of teeth of this outer gear 74 is 38.

On the screw member 63, a tube 75 is formed on its outer periphery, and the inner periphery of this tube 75 has an inner gear 76 of which number of teeth is 40, with a difference in the number of teeth of 2 from the outer gear 74 of the rotating ring 62. This inner gear 76 is partially engaged with the outer gear 74, and the rotating ring 62 and screw member 63 are overlaid inside and outside.

In the shaft core part of the screw member 63, female threads 77 are cut so as to be engaged with the mounting bolt 68.

The middle opening part of the flange ring 65 is freely held on the outer periphery of the screw member 63, and bearings 78 are placed at the mutually opposing sides. In the mutually confronting parts of the flange ring 65 and the rotating ring 62 (see FIG. 8), the engaging means for regulating the revolution of the rotating ring 62 and permitting its rotation is formed, and this engaging means is composed of an engaging recess 79 formed in the rotating ring 62, engaging recess 80 formed in the sliding member 64, and a ball 81 to be engaged therewith. Such engaging means is formed at six positions.

Figure 10:
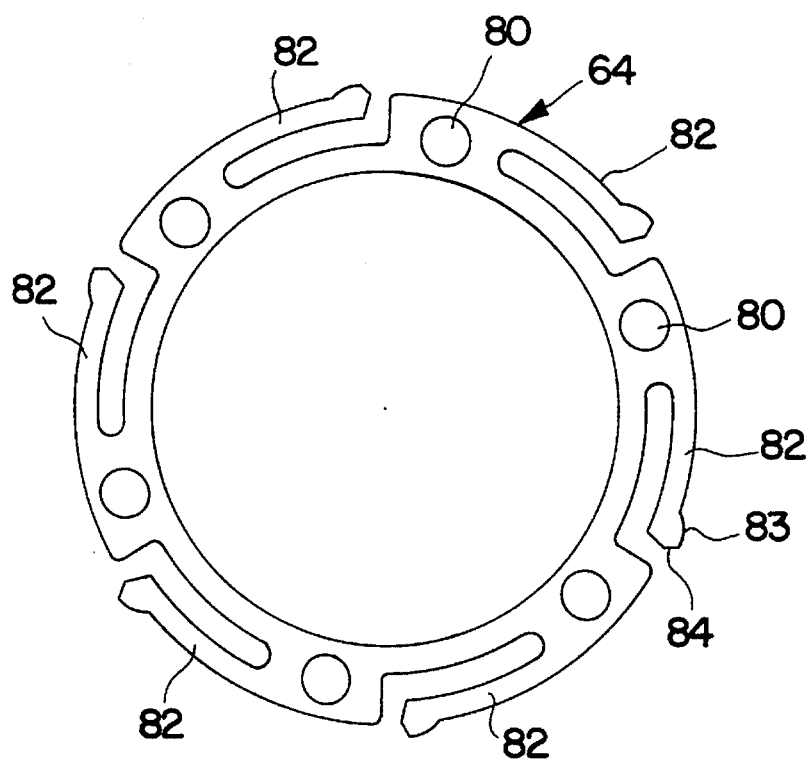
FIG. 10 is a right side view of a sliding member.

The sliding member 64 comprises a unidirectional torque limiter together with the flange ring 65 as shown in FIG. 10, and in a ring form it forms six elastic parts 82 by cutting in at six equal divisions on the periphery. A sliding surface 83 is formed at the side corresponding to the tightening direction of the screw member 63 of the outer periphery of the free end of each elastic part 82, while a defining surface 84 is formed at the side corresponding to the releasing direction. The elastic force of the elastic parts 82 is set by the thickness and cutting depth of the corresponding parts 82.

Figure 11:
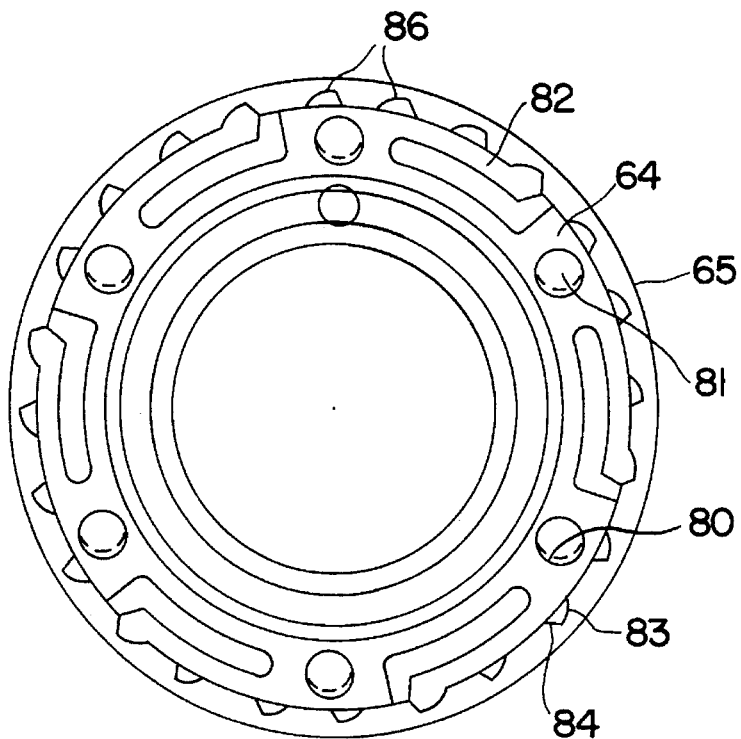
FIG. 11 is a right side view showing the state of mounting a sliding member on a flange ring.

The sliding member 64 is fitted into a groove 85 formed in the inner periphery at the inside of the flange ring as shown in FIG. 8, and moreover as shown in FIG. 11, a multiplicity (24, in this embodiment) of engaging recesses 86 are formed corresponding to the sliding surface 83 and defining surface 84 of the elastic parts of the sliding member 64 on the inner surface of the groove 85. When the tightening load acts on the engaging recess 80 of the sliding member 64 through the ball 81 in the engaged state of the sliding surface 83 and defining surface 84 of these elastic parts 82 and the engaging recess 86 and the load exceeds a preset value, the elastic parts 82 are deformed elastically, and the sliding surface 83 and the engaging recess 86 are dislocated, and the sliding member 64 idles in the groove 85 of the flange ring 65.

Figure 7:
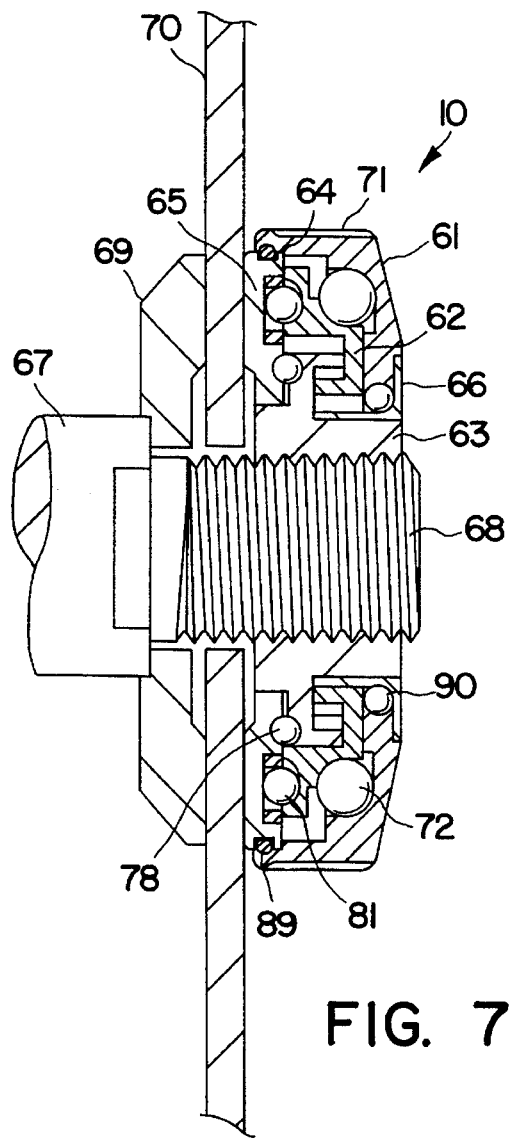
FIG. 7 is a longitudinal sectional view of another embodiment of a tightening screw.

Back to FIG. 7 and FIG. 8, the outer periphery of the flange ring 65 is overlaid with the inner periphery of the end of the operating ring 61, and grooves 87, 88 are formed in the confronting sides. Stopping rings 89 are provided in these grooves 87, 88. The stopping rings 89 may be O-rings for sealing purpose.

The holding ring 66 is press-fitted to the end outer periphery of the screw member 63, and the operating ring 61 is borne through a bearing 90, thereby preventing the operating ring 61 from slipping out.

To mount the rotary tool 70 on the mounting bolt 68 of the drive shaft 67, the flange ring side 65 of the tightening screw 10 is set against the rotary tool 70 side, and the female threads 77 of the screw member 63 of the tightening screw 10 are matched with the mounting bolt 68, and the knurling 71 of the operating ring 61 is directly rotated by hand to screw in the female threads 77.

At the time of screwing, if the flange ring 65 is not contacting with the rotary tool 70, the operating ring 61, rotating ring 62, screw member 63, and flange ring 65 are rotated together by the assembling load of screw 10, and the rotation of the operating ring 61 directly becomes the rotation of the screw member 63.

When the flange ring 65 abuts against the rotary tool 70 and its rotation is loaded to stop the rotation of the flange ring 65 with the load, the rotating ring 62 is also stopping of its revolution by the engagement between the engaging recesses 79, 80 with the flange ring 65 and the ball 81, and only rotation between flange ring 65 and rotation ring 62 is permitted. Further rotation of the operating ring 61 causes the rotation ring 62 to rotate in the same direction by the same principles as discussed above in regards to the embodiment of FIGS. 4 through 6. This rotation causes to rotate the screw member 63 by engagement of the teeth between outer gear 74 and inner gear 76. Due to the difference in the number of teeth between the outer gear 74 of the rotating ring 62 and the inner gear 76 of the screw member 63 (this rotating direction is same as the rotating direction of the operating ring 61), this rotation results in a reduction of the speed of rotation of the operating ring 61. This speed reduction results in a torque increase, and the screw member 63 is engaged with the bolt 68 to be tightened with the increased torque and reduced speed. Thus, the rotary tool 70, as the object of tightening, is tightened and fixed to the inner flange 69 with a large tightening force of increased torque.

Incidentally, the reduced speed rotation of the screw member 63 the operating ring 61 is (number of teeth of inner gear 76–number of teeth of outer gear 74)/number of teeth of outer gear 74, and in this embodiment, a great speed reduction of (40 teeth–38 teeth)/38 teeth=2/38=1/19 is obtained.

When the tightening force of the tightening screw 10 reaches a preset value, that is, the action force set in the elastic parts 82 of the sliding member 64, the elastic parts 82 are deformed elastically, and the sliding surface 83 is dislocated from the engaging recess 86 of the flange ring 65. The sliding member 64 then rotates (idles) in the groove 85 of the flange ring 65, so that the rotating ring 62 is deprived of its rotation and only revolves, while the outer gear 74 rotates about the circumference of the inner gear 76 of the screw member 63, thereby cutting off torque transmission.

Therefore, if the operating ring 61 is rotated in the tightening direction, the screw member 63 will not be tightened.

Thus, tightening and using the rotary tool 70, when the rotary tool 70 is used with impact, if rotational force in the tightening direction acts on the operating ring 61 side by its impact and its reaction, since the torque transmission is cut off as mentioned above, the screw member 63 will not be tightened more by this rotational force.

When loosening the tightening screw 10, since the flange ring 65 is already abutting against the rotary tool 70 and its rotation has been arrested, the rotating ring 62 is in its rotating state, and the rotating operation of the operating ring 61 in the loosening direction (canceling direction) will cause the rotating ring 62 to rotate with an increased torque the same as described above so that the tightening may be loosened.

Moreover, the rotation in the loosening direction above is to define so as not to displace the elastic parts 82 as the defining surface 84 of the elastic parts 82 of the sliding member 64 acts on the engaging recess 86 of the flange ring 65. Therefore, the torque limiter is in an inactive state, so that it is possible to loosen with a greater force than used in tightening.

Successively, when the screw member 63 is loosened and the flange ring 65 is spaced from the rotary tool 70 and its rotation is thus permitted, the entire tightening screw 10 rotates in one body. The rotation of the operating ring 61 thus becomes directly the rotation of the screw member 63, thereby loosening screw member 63 quickly.

In the embodiment 3, the tightening screw 10 is rotated by hand, but a wrench or power tool may be used. In such a case, it is possible to operate to tighten and loosen with a less effort.

The tightening screw 10 shown in FIG. 7 is in a nut form; but it may be also a bolt form. That is, as in the embodiment shown in FIG. 12, male threads 92 are formed at one side of the screw member 63 of the tightening screw 10, while a hexagonal hole 93 for inserting a hexagonal wrench is formed on the other side.

Figure 12:
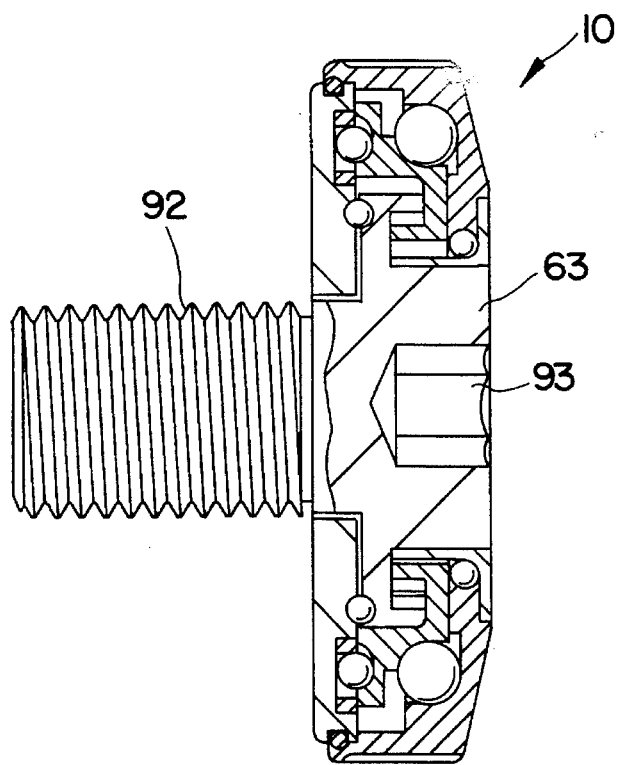
FIG. 12 is a longitudinal sectional view of a bolt type tightening screw.

In FIG. 12, the other constitution of the device is the same as the constitution of the tightening screw 10 of the embodiment shown in FIGS. 7 to 11, and a detailed description is omitted. In the case of the bolt form, too, the same action and effect as in the tightening screw 10 in the previously described embodiment may be obtained.

The torque transmission member in the tightening screw 10 of the previous embodiment was composed of outer gear 74 of rotating ring 62, inner gear 76 of screw member 63, engaging recesses 79, 80 by rotating ring 62 and sliding member 64, and ball 81, and this torque transmission member formed a differential speed reduction mechanism resulting in a torque increase function. But, when forming only the unidirectional torque limiter without using the torque increase function, the rotating ring 62 is omitted, and confronting sides are formed between the operating ring 61 and screw member 63. The unidirectional torque limiter (sliding member 64) may be composed between these confronting sides. Or the sliding member 64 may be provided at the rotating ring 62 side.

Figure 13:
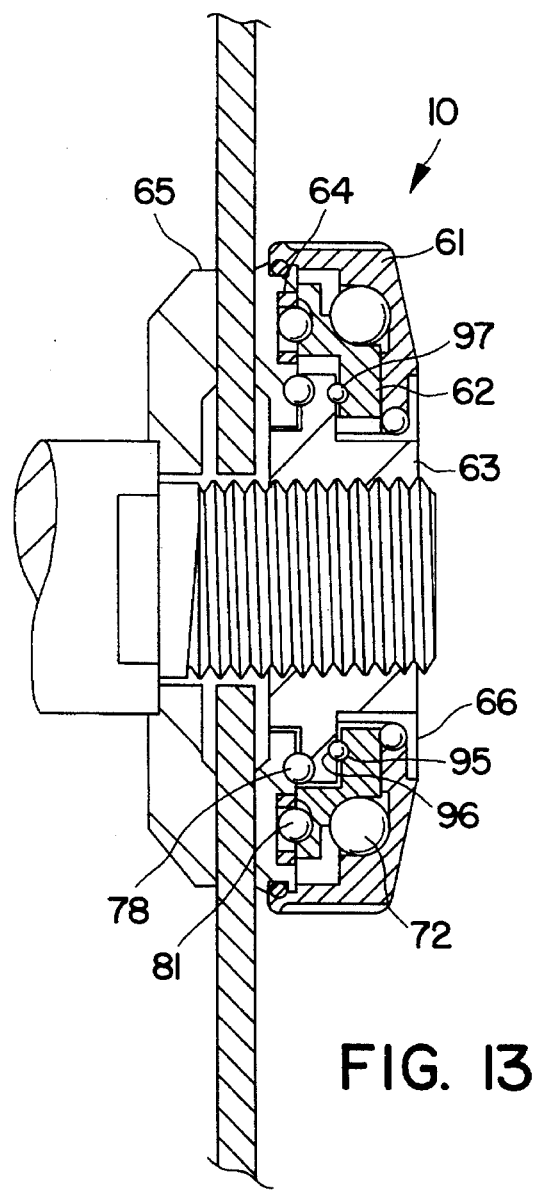
FIG. 13 is a longitudinal sectional view of a tightening screw showing another example of differential reduction mechanism.

Moreover, as another example of a differential speed reduction mechanism by torque transmission member of the embodiment shown in FIGS. 7 through 11, the tightening screw 10 may be formed as shown in FIG. 13. In the case of this tightening screw 10, except for the rolling groove 95 of rotating ring 62 and rolling groove 96 of screw member 63 formed on the confronting surfaces, and ball 97 interspaced between them, the constitution is the same as in the tightening screw 10 shown in FIGS. 7 to 11, and a detailed description is omitted.

Figure 14:
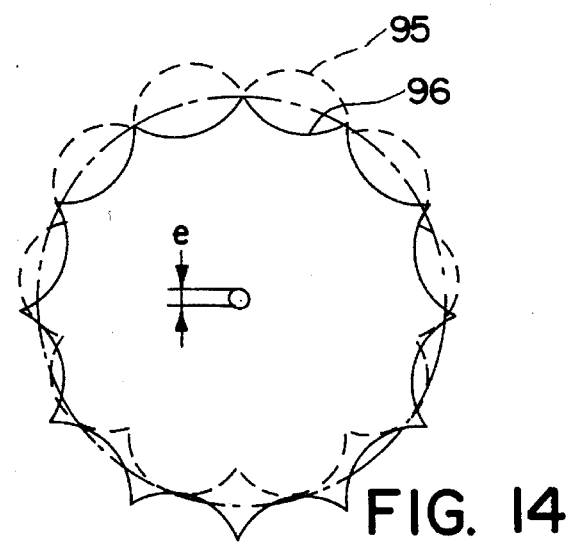
FIG. 14 is an explanatory diagram of a rolling groove.

That is, as shown also in FIG. 14, a rolling groove 95 is cut in the rotating ring 62 side in a circular section by epicycloid curve, while a rolling 62 groove 96 is cut in the screw member 63 side in a circular section by hypocycloid curve, and multiple balls 97 are held between these rolling grooves 95 and 96 so as to be free to roll.

The amplitude of the rolling grooves 95, 96 is set the same as the eccentricity e of the rotating ring 62, and the wave number of the rolling groove 95 at the rotating ring 62 side is cut in 10 waves, while the wave number of the rolling groove 96 at the screw member 63 side is cut in 12 waves, and the number of the balls 97 held between the rolling grooves 95 and 96 is set at 11 or less.

Thus, when the rotating ring 62 is rotated by the rotation of the operating ring 61, the balls 97 roll along the rolling grooves 95, 96, and the screw member 63 comes to revolve by itself, and this revolution is much slowed down as compared with the rotation, so that the slow down output causes an increased torque output.

In the case of this embodiment, the wave number of the rolling groove 95 of the rotating ring 61 is 10 waves, and the wave number of the rolling groove 96 of the screw member 63 is 12 waves, and the difference in wave number is 2 waves, the speed reduction rate is 2 waves/10=⅕ and hence a large speed reduction ratio may be obtained by increasing the wave number.

Thus, the torque transmission member may be formed by composing the differential speed reduction mechanism by rolling grooves 95, 96 and balls 97.

It will be apparent to those skilled in the art that various modifications and variations can be made in the present invention without departing from the scope or spirit of the invention. For example, features described or illustrated as part of one embodiment can be used in another embodiment to yield a still further embodiment. It is intended that the present invention cover such modifications and variations as come within the scope of the appended claims and their equivalents.

What is claimed is:

1. A torque enhancing tightening device for tightening a tool to a drive spindle, said device comprising:

at least one screw member having threads defined thereon for engagement with complimenting threads of a drive spindle;

a flange member axially aligned with said at least one screw member and defining a tool contacting surface, said flange member disposed so as to be pressed against a tool to be held relative to said drive spindle by threaded advancement of said screw member;

an operating ring disposed concentric about said screw member and configured for receiving an applied rotational force to operate said device; and an eccentric transmission mechanism between said operating ring and said at least one screw member, said eccentric transmission mechanism transferring rotational movement of said operating ring to said at least one screw member by an eccentric movement.

2. The device as in claim 1, wherein said screw member comprises a nut having female threads defined therein for threaded engagement with male threads on said drive spindle.

3. The device as in claim 1, wherein said screw member comprises a bolt having male threads defined thereon for threaded engagement with female threads defined in said drive spindle.

4. The device as in claim 1, wherein said flange member comprises a flange ring disposed adjacent an axial end of said screw member.

5. The device as in claim 4, further comprising a bearing member disposed between said flange ring and said screw member.

* * * * *